Sept. 23, 1969   L. S. GARRETT ET AL   3,469,084
UNIVERSAL ENCODER TESTER
Filed Aug. 24, 1965   4 Sheets-Sheet 2
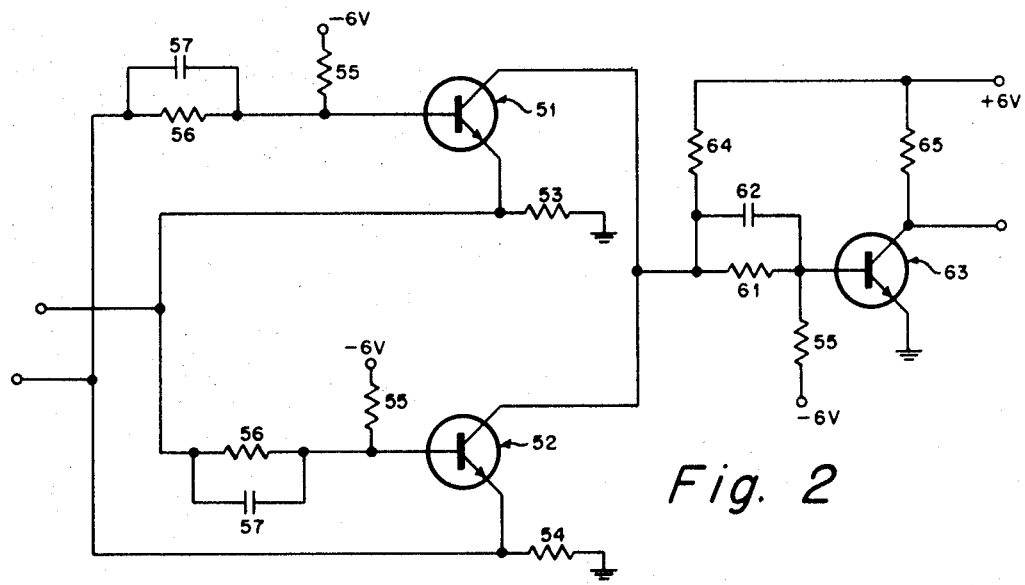
Fig. 2
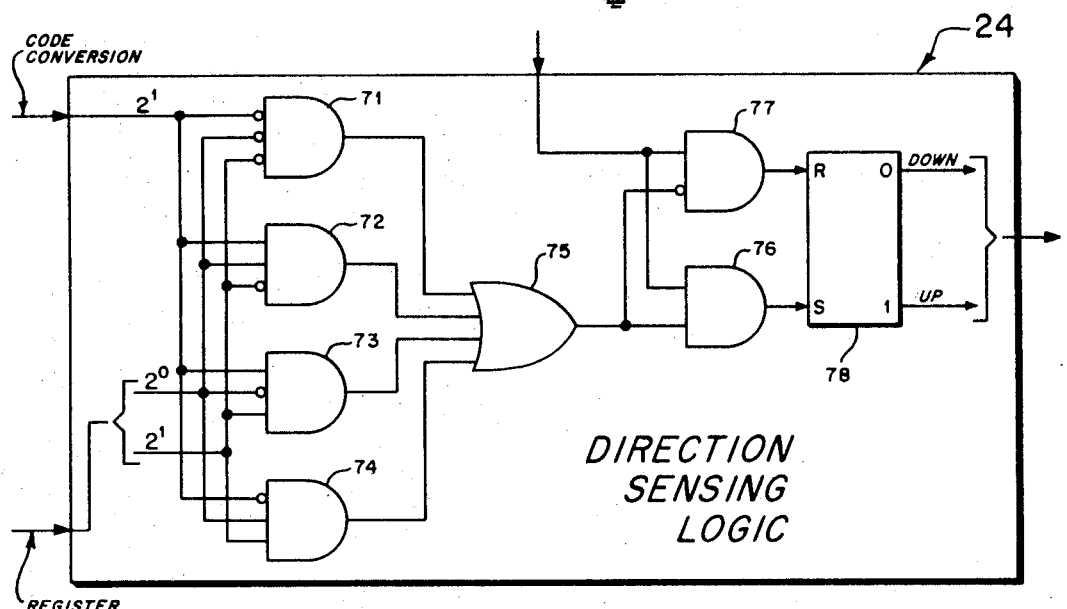
Fig. 3
| REGISTER | | CODE CONV. | DIR. OF COUNT |
|---|---|---|---|
| $2^1$ | $2^0$ | $2^1$ | |
| 0 | 0 | 1 | DOWN |
| 0 | 0 | 0 | UP |
| 0 | 1 | 0 | DOWN |
| 0 | 1 | 1 | UP |
| 1 | 0 | 0 | DOWN |
| 1 | 0 | 1 | UP |
| 1 | 1 | 1 | DOWN |
| 1 | 1 | 0 | UP |
Fig. 3a
INVENTORS
LANE S. GARRETT
JOHN M. K. BERGEY
STUART G. GREENBERG
FRANK J. ALESSANDRO
BY
ATTORNEYS United States Patent Office 3,469,084
Patented Sept. 23, 1969

3,469,084
UNIVERSAL ENCODER TESTER
Lane S. Garrett, Fountainville, John M. K. Bergey, Doylestown, Stuart G. Greenberg, Philadelphia, and Frank J. Alessandro, Upper Darby, Pa., assignors to the United States of America as represented by the Secretary of the Navy
Filed Aug. 24, 1965, Ser. No. 482,310
Int. Cl. G06f 11/08
U.S. Cl. 235—153                8 Claims

ABSTRACT OF THE DISCLOSURE

An encoder tester for testing and evaluating analog-to-digital converters with respect to the performance and operating parameters thereof. Testing and evaluation is achieved by determining the noise bandwidth and amplitude of the encoder under test and by thereafter converting the digital encoder output representations into sequential binary codes. These codes are subsequently monitored and any resultant errors in the encoder output as reflected in the binary codes are recorded by individual bit counters.

---

The invention described herein may be manufactured and used by or for the Government of the United States of America for governmental purposes without the payment of any royalties thereon or therefor.

The present invention relates to a digital testing system and more particularly to a universal testing system for analog-to-digital encoders.

In the field of digital calculating and computing equipment it has been necessary to employ analog-to-digital encoders to convert analog information into usable digital form. Analog-to-digital converters or encoders utilize many conversion techniques, such as solid state, optical, brush or mechanical contact, magnetic, capacitive, and exotic techniques such as nuclear radiation and detection. The digital forms in which they are presented in may be many and various, such as natural binary, binary coded decimal, gray code, V scan, U scan and Gillham. The voltages in which they come may vary as well as the number of binary bits and bit rates. The means of testing these encoders has been needed but due to the widely varying parameters of the outputs of the different encoders it has been heretofore found necessary to design a separate tester for each type of encoder. Moreover, no method was available for recording every error or miscount within a given test period. Short duration errors were frequently missed and no practical method for continuously and completely monitoring an encoder output for an extended period of time was available.

The general purpose of this invention is to provide an encoder tester which is adaptable to the output of any known encoder both as the parameters of the output such as bit rate and number of bits and voltage, and also to the type of code used. To attain this the present invention contemplates a special purpose asynchronous digital computer system that will automatically isolate and help to find encoder failures under dynamic test conditions. The present invention evaluates the encoder under test in terms of errors per unit time. More particularly, the invention provides a means for recording every error or miscount within a given test period occurring within the encoder. Short duration errors occurring at the encoder output are continuously and completely monitored by the present invention. Moreover, the invention may be adapted to any encoder having a known or expected sequence of digital information issuing therefrom. To achieve this the invention employs a digital logic circuit with a register receiving each sequential count and comparing it with the subsequent count from the encoder to determine if the encoder output is in proper sequence. The circuit synchronously detects whether the sequence from the encoder is going up or down and changes the register accordingly and then compares the condition of the register with the output of the encoder, the differences being counted in error counters. The invention also provides an adjustable interface which may receive any one of a range of voltage levels, either positive or negative, and provides capacitive means for shorting out all pulses of less than a selectable width in order to check the error level at different bandwidths. There are also a number of selectable code conversion devices for translating different digital codes into binary for use in the register. The invention also comprises a number of discrete circuits providing a very high speed of response with low cost in the various parts of the system. Thus, it is the resultant achievement of the present invention to determine if the data stored in the register matches the data provided by the encoder after it has been converted into a sequence of binary codes by a code conversion logic circuit. If it is found that the two data streams do not match, the data in the register is corrected so that the two streams become identical. Through the use of this technique it is then possible, for a given encoder, by periodically monitoring the noise conditions thereof, to estimate when the encoder will deteriorate to a point causing failure. Encoders exhibiting significant noise would then be replaced by new units before an expected failure occurred. The accumulation of the necessary data needed before this type of maintenance can be effectuated is facilitated through the use of the present invention. In addition, intermittent encoder failure is readily verifiable with the present invention since the invention evaluates the present condition of the encoder under test. This is done in the length of time required for system setup and complete encoder cycling in both directions. A failure is thus quickly isolated to the bit or bits in error, the magnitude of the error being recorded. Obviously an error in a more significant bit is more serious than an error in a lesser one and in many applications a certain number of errors per unit time may be tolerated. Nonetheless, the present invention records every error occurring within a given time interval and bandwidth thus showing the suitability of the encoder for a particular application.

Therefore it is an object of the present invention to provide an analog-to-digital encoder tester which compares successive outputs of the encoder to determine errors in sequence.

Another object of the invention is to provide an encoder tester capable of testing encoders of widely varying outputs.

A further object of the invention is the provision of an encoder tester having circuits responding at high speed but made at low cost.

Other objects and many of the attendant advantages of this invention will be readily appreciated as the same becomes better understood by reference to the following detailed description considered in connection with the accompanying drawings in which like reference numerals designate like parts throughout the figures thereof and wherein:

FIG. 2 shows a circuit diagram of a fast comparator gate according to the invention shown in FIG. 1;

FIG. 3 shows a logic diagram of the direction sensing logic according to the invention as shown in FIG. 1;

FIG. 3a shows the truth table of the direction sensing logic shown in FIG. 3;

Figure 1:
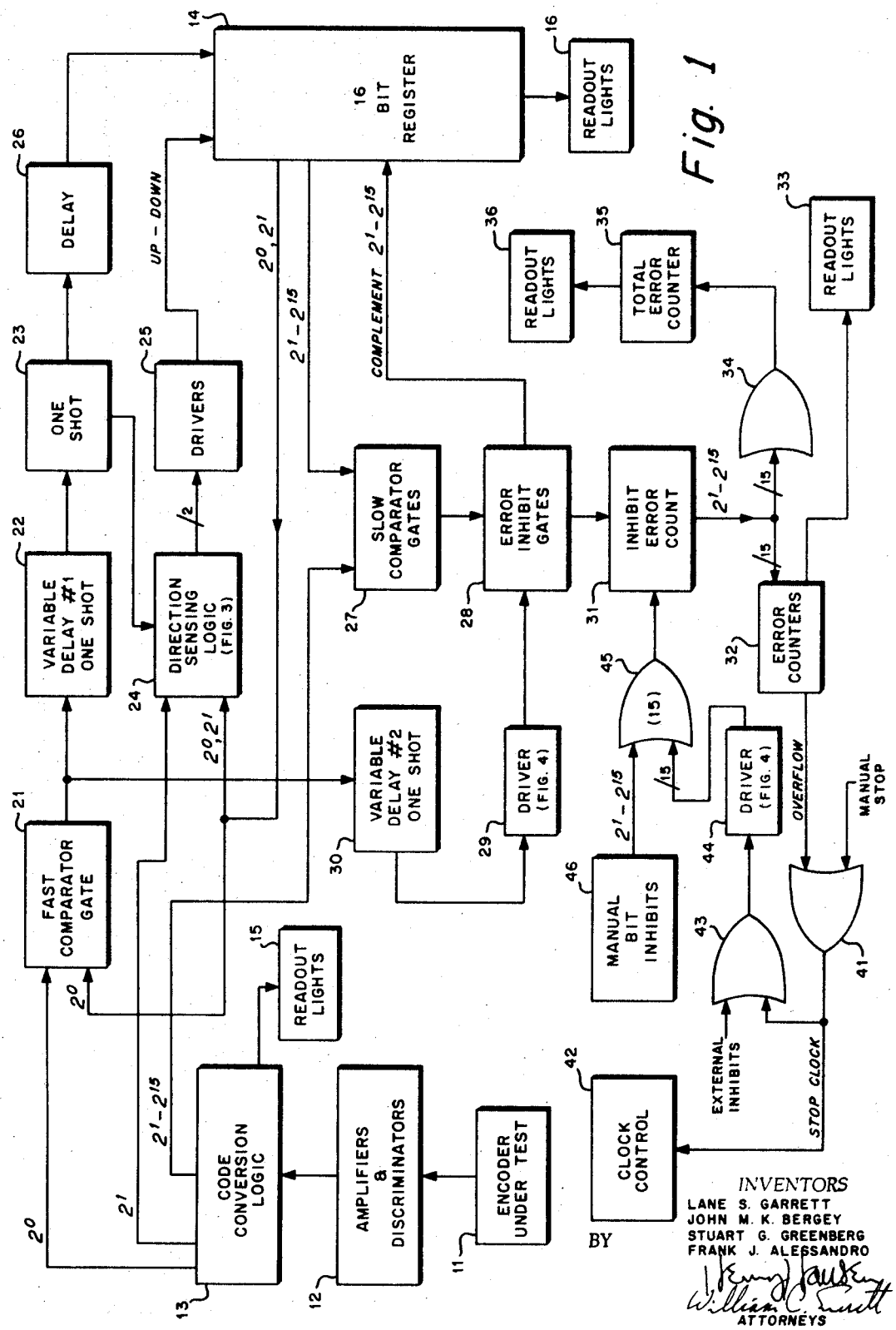
FIG. 1 shows a block schematic diagram of the encoder tester system according to the invention.
Figure 6:
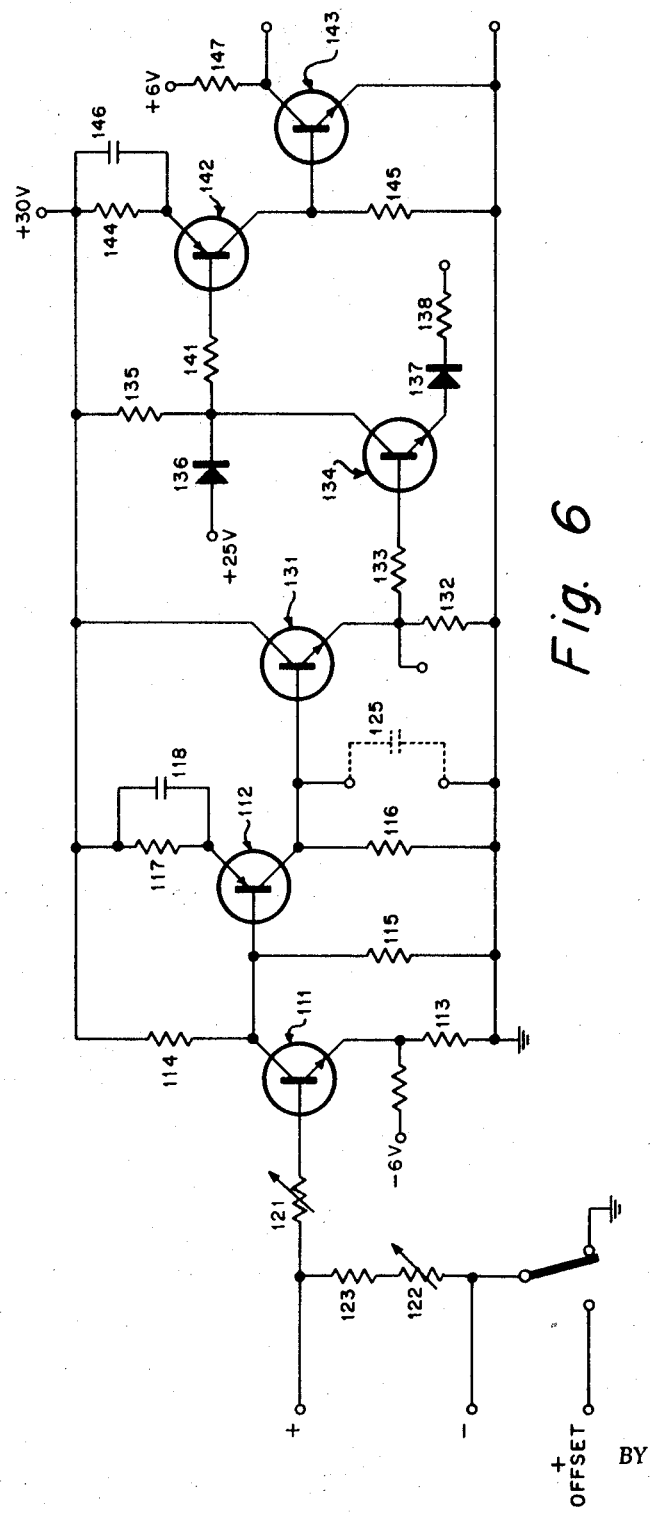
FIG. 6 shows an amplifier and discriminator stage in the interface section of the encoder tester according to the invention as shown in FIG. 1.

In FIG. 1 there is shown an encoder 11 being tested by the encoder tester according to the invention. The outputs of the encoder 11 will be in some digital form and are fed into an interface 12 containing amplifiers and discriminators. The purpose of the amplifiers and discriminators in interface 12 is to perform certain preliminary test functions on the incoming signal from the encoder such as to determine its noise bandwidth and to convert the voltage levels from the encoder to the voltage level used throughout the encoder tester logic system which may be, for example, at six volts. There is at least one amplifier and discriminator stage in interface 12 for each bit coming from encoder 11. The circuit diagram of each amplifier and discriminator stage is shown in FIG. 6. In a typical system in which sixteen output bits may be required and in which two contacts are used in each bit but the least significant bit there will be thirty-one amplifier and discriminator stages in the interface 12. The outputs from interface 12 are fed into a code conversion logic 13 where the code is converted from whatever it may be, whether binary code, decimal, gray code, V scan, U scan or Gillham, for example, into a binary code. If the output of the encoder is a straight binary code the outputs will be fed straight through. In any event, the output of code conversion logic 13 is a set of parallel bits, for example sixteen, in natural binary code. By means which will be described subsequently this binary code will be registered on a sixteen bit register 14 and will be read out on readout lights 15 and 16 connected respectively to the code conversion logic 13 and register 14.

The action of the error detection mechanism is begun by a fast comparator gate 21 which compares the condition of the least significant bit $2^0$ from code conversion logic 13 with the least significant bit $2^0$ from register 14. If a difference is detected it means that there has been a change of number in the code conversion logic 13. The fast comparator gate 21 sends a signal to a variable delay #1 one shot 22 which after a slight delay sends a signal to a one shot 23. One shot 23 sets into action a direction sensing logic circuit 24 which compares the two least significant bits on register 14 with the next to least significant bit $2^1$ of the code conversion logic 13. In a manner to be described in connection with FIG. 3 direction sensing logic 24 sends a signal to drivers 25 which send either an up or down signal to the register 14. One shot 23 also sends a signal to register 14 through a delay 26 which causes the register 14 to count up or down depending on the signal from drivers 25. The contents of register 14 should then agree with the contents of code conversion logic 13. Bits $2^1$–$2^{15}$ are compared asynchronously by a set of slow comparator gates 27 comprising Exclusive OR gates in which the bits are compared bit for bit. The outputs of gates 27 are passed into a set of error inhibit gates 28 which are inhibited by a driver 29 which is operated for a predetermined period of time by a variable delay #2 one shot 30. The delay in one shot 30 is sufficient to insure that logic 13 has had time to set and is variable by the operator. When variable delay one shot 30 turns off again after its predetermined time it permits the outputs to be passed out of error inhibit gates 28 if there are any differences between the bits of register 14 and code conversion logic 13. The outputs of error inhibit gates 28 indicate which bits of register 14 are not in alignment with logic 13. The outputs are sent back to register 14 to correct it by complementation.

The outputs indicating errors, after they are permitted to pass by driver 29, are also passed through an inhibit error count 31. Error count 31 permits the signals to pass in parallel to the error counters unless inhibited by a signal which occurs under certain specified circumstances to be described subsequently. The error indications pass to fifteen separate error counters 32 where they are counted and stored. The counters 32 divide the number of indicated errors by two, because each time a stage of register 14 is complemented it has to be complemented back on the next change if the error in the encoder has corrected itself. The register 14 is complemented to make sure that logic 13 and register 14 do not get out of synchronization. The contents of the fifteen error counters 32 are read out on readout lights 33. The errors are also passed to an OR gate 34 where they are totalled up on a total error counter 35 and read out on readout lights 36.

If any of the error counters 32 run to the limit of their count an overflow signal is passed to an OR gate 41. This OR gate also has passed into it a manual stop signal operable by the operator. The output from OR gate 41 is passed to a clock control 42 which stops the clock connected with the machine to indicate the time in which the limit of errors was reached. The signal from OR gate 41 is also passed to another OR gate 43 into which may be passed external inhibit signals which are useful for a variety of reasons to be mentioned subsequently. The output of OR gate 43 operates a high fan-out driver 44 which drives fifteen OR gates 45 leading into the fifteen stages in the inhibit error count 31. Each of the fifteen OR gates 45 also has a manual bit inhibit 46. When the driver 44 is activated, all of the inhibit error count gates 31 are inhibited from passing any signals to the error counters 32 or 35. Each of the stages can also be individually inhibited by a signal from its corresponding manual bit inhibit 46.

In FIG. 2 is shown the fast comparator gate 21. There are two transistors 51 and 52 each having a load resistance 53, 54, respectively, in the emitter circuits thereof. The base of each of transistors 51, 52 has a link through a resistance 55 to a —6 volt bias source as shown and through an RC coupling comprising a resistance 56 and a capacitance 57 to one of the two inputs. Each of the inputs is also directly linked to the emitter of the opposite transistor. The collectors of both transistors 51 and 52 are linked through an RC coupling comprising a resistance 61 and a capacitance 62 to the base of a third transistor 63, the base of which is also connected to a —6 volt bias source through a resistance 55. A resistance 64 connects the collectors of the first two transistors to a 6 volt positive supply and resistance 65 is the load resistance for the transistor 63. The output of the fast comparator gate is across the transistor 63. From consideration of the circuit it will be apparent that if the inputs are the same, either high or low, the output will be low. However, if the inputs are different, i.e., if one is high and the other is low, one of the two transistors 51 or 52 will provide a low impedance path to ground, which will have the effect of permitting transistor 63 to be cut off, thereby raising its output voltage at its collector to a high level and giving an indication out that there is a disagreement between the inputs. The slow comparator gates 27 are similar to that shown in FIG. 2 except for a small delay in the output.

The direction sensing logic 24 shown in FIG. 3 has four AND gates 71, 72, 73 and 74. Gates 71 through 74 feed into an OR gate 75 which feeds an output into two AND gates 76 and 77. Gate 76 is enabled by the signal directly from OR gate 75, and AND gate 77 is enabled by the inversion of the signal from OR gate 75. Both gates 76 and 77 receive a pulse from one shot 23 which will pass through one of the two gates depending on which is enabled. The signals pass through to the set and reset portions of a flip-flop 78, the condition of which indicates whether the register 14 is to be counted up or down. As indicated by the inputs to gates 71 through 74 by comparison with the truth table of FIG. 3a, if any of the four AND gates 71 through 74 is satisfied it indicates an up condition. When a signal is passed through gate 75, gate 76 is activated at the occurrence of the pulse from one shot 23 and flip-flop 78 is set, indicating an up condition. If none of gates 71 through 74 is satisfied, gate 75 stays low and gate 77 is satisfied when the pulse comes through from one shot 23. Then flip-flop 78 is reset indicating a down condition. The two signals from flip-flop 78 pass to register 14 through drivers 25 to control the count on register 14 when a count pulse comes through from delay 26.

Figure 4:
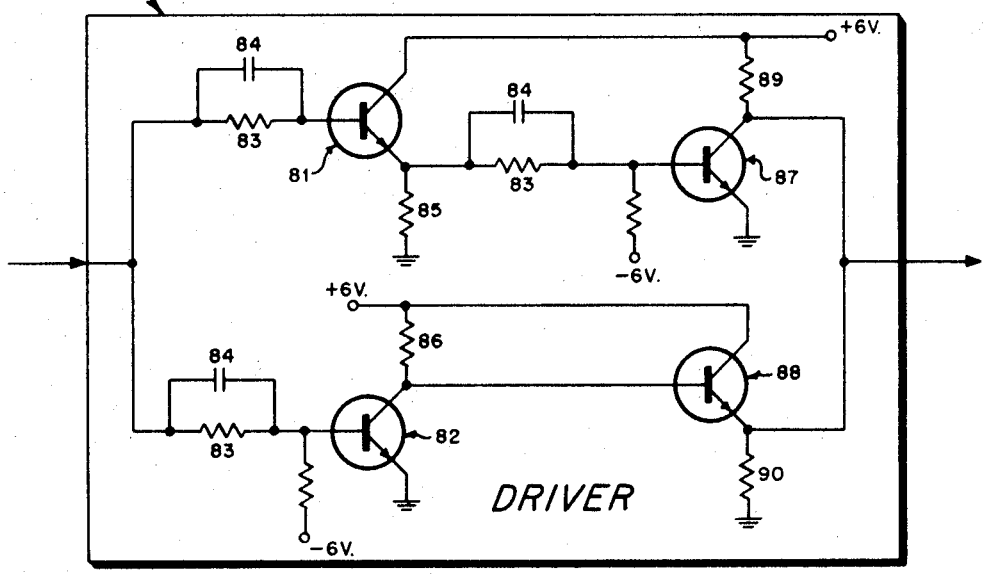
FIG. 4 shows a circuit diagram of a high speed, high fan-out driver according to the invention as shown in FIG. 1.

FIG. 4 shows the high speed high fan-out driver used for drivers 29 and 44. Two transistors 81 and 82 have their bases linked through RC couplings comprising resistances 83 and capacitances 84 to the input. Transistor 81 has a load resistor 85 in its emitter circuit while transistor 82 has its load resistance 86 in its collector circuit. The emitter of transistor 81 is linked through an RC coupling comprising resistance 83 and capacitance 84 to the base of a third transistor 87. The bases of transistors 87 and 82 are connected to a bias source as shown. The collector of transistor 82 is linked directly to the base of a fourth transistor 88. Transistor 87 has a load resistance 89 in its collector circuit while transistor 88 has its load resistance 90 in its emitter circuit. The outputs are linked together to the output of the driver. It will be seen, of course, that when the input is high transistors 81 and 87 will be conductive and the output will be low, being connected to ground through the low resistance of conducting transistor 87. When the input is low, transistor 82 will be cutoff which will cause transistor 88 to conduct thereby connecting the output to the voltage supply through the low resistance of conducting transistor 88. Therefore, whether the input is high or low the output will be connected through a very low impedance to either ground or the voltage source providing a very high fan-out capability. It will be noted also that the driver provides a logical inversion of the input signal.

Figure 5:
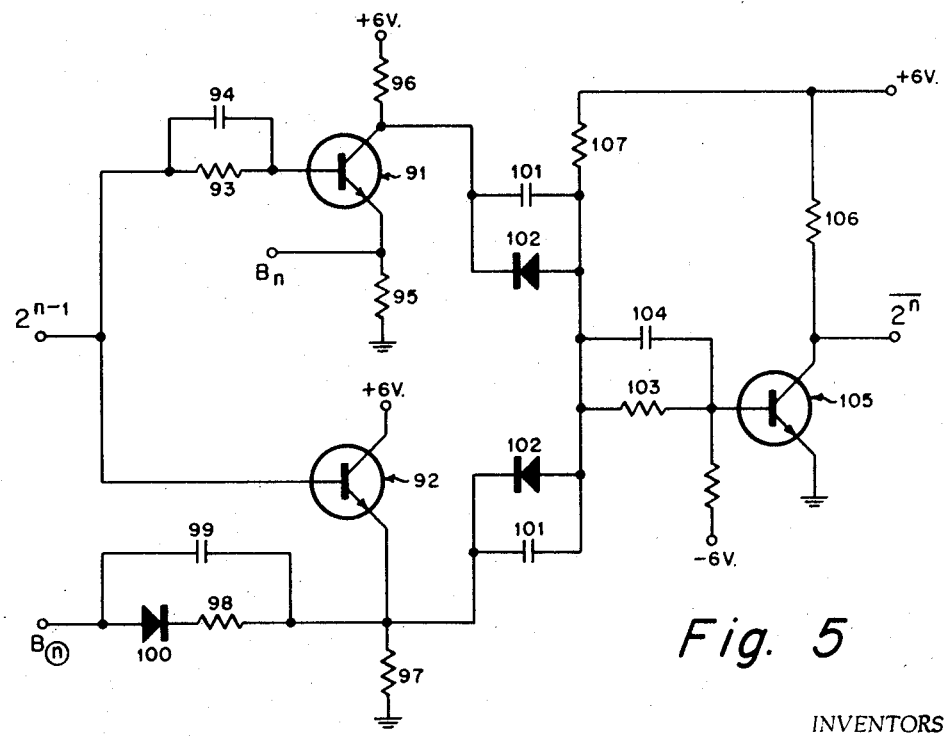
FIG. 5 shows a circuit diagram of a stage converting V scan logic to binary code according to the invention.

In FIG. 5 is shown a circuit diagram for a stage of the logic that converts the V scan code from a V scan encoder into binary form. A V scan code operates with two brushes on each bit of the code and the choice of which of the two brushes is detected is determined by the condition of the next most significant digit, i.e., $\overline{2^n} = 2^{n-1}B_n + \overline{2^{n-1}}B_{\text{Ⓖ}}$ where $2^{n-1}$ is the output of the next most significant stage, $B_n$ is the condition of the lagging brush and $B_{\text{Ⓖ}}$ is the condition of the leading brush. Two transistors 91, 92 have their bases linked to the output of the next most significant stage, transistor 91 being linked through an RC coupling comprising resistance 93 and capacitance 94. There is a load resistance 95 in the emitter circuit of transistor 91 and a load resistance 96 in the collector circuit. The input of $B_n$ is placed across the resistance 95. Transistor 92 has a load resistance 97 in its emitter circuit into which is placed the input $B_{\text{Ⓖ}}$ through a CRD network comprising resistance 98, capacitance 99, and diode 100. Diode 100 isolates the input $B_{\text{Ⓖ}}$ when there is a high signal on resistance 97. The collector of transistor 91 and the emitter of transistor 92 are each connected through a CD network comprising capacitance 101 and diode 102 to an RC network comprising resistance 103 and capacitance 104 which connects to the base of a transistor 105. Transistor 105 has a load resistance 106 in its collector circuit and a resistance 107 connects the two CD networks to a voltage source. When the input to the circuit is high, both of the transistors 91 and 92 are caused to conduct. This will cause the circuit in effect to be dependnt upon the condition of the input $B_n$. If it is high, the output at that point will be high. If it is low, the output at that point will be low. When the input is high the conduction of transistor 92 causes the signal across resistance 97 to be high regardless, and therefore the condition of $B_{\text{Ⓖ}}$ is immaterial. When the input $2^{n-1}$ is low, both transistors 91 and 92 are blocked. This effectively makes the input $B_n$ immaterial as the output at the collector of transistor 91 will be high regardless. Then if $B_{\text{Ⓖ}}$ is high, the output will be high and if $B_{\text{Ⓖ}}$ is low the output will be low. If both outputs from transistors 91 and 92 are high, transistor 105 will conduct and the output will be low. If the outputs of either transistors 91 or 92 are low, it will ground the front end of the RC network 103–104 and cut off transistor 105 causing a high output from that stage. It will be noted that this produces an inverted function, as indicated by the bar over the output.

The amplifier and discriminator of FIG. 6, of which there are 31 in interface 12 has an input amplifier comprising transistors 111 and 112. The emitter of transistor 111 is biased as shown. There is also a resistance 113 in the emitter circuit and a reistance 114 in the collector circuit. Resistances 115, 116 and 117 and capacitance 118 complete the amplifier circuit. Either plus or minus inputs may be placed on the base of transistor 111 through variable resistances 121, 122 and resistance 123. The offset voltage is used if the input is negative. On the load resistance 116 from transistor 112, there is a replaceable capacitor 125 shown in dotted lines. The purpose of capacitance 125 is to shunt signals above a certain frequency. This frequency may be selected by selecting different values for capacitance 125. In general, the pulses of short duration will be noise pulses, and by shunting out pulses of above a certain frequency and testing for errors it is possible to determine at what bandwidth the noise pulses begin to show up.

The voltage across capacitance 125 is fed to the base of a transistor 131 which has a load resistance 132 in its emitter circuit. The output of the amplifier may be taken across resistance 132 if desired to test the bandwidth. The output also is taken through a resistance 133 to the base of a transistor 134. In the collector circuit of transistor 134 there is a load resistance 135 connected to a blocking voltage of 25 volts through a diode 136. Connected to the emitter of transistor 134 is a diode 137 and resistance 138 leading to a discriminating voltage. The relative amplitudes of the voltage into the base of transistor 134 and the discriminating voltage will determine whether the output is going to be high or low. The output of transistor 134 is led through a resistance 141 to an amplifier section comprising transistors 142 and 143 with appropriate emitter and collector resistances 144 and 145 and capacitance 146. There is a load resistance 147 in the collector circuit of transistor 143. The output of the amplifier and discriminator will be essentially either zero or 6 depending on whether the voltage on resistance 132 is less than or greater than the discriminating voltage.

The operation of the encoder tester is as follows: as each set of bits comes into interface 12 and is converted by code conversion logic 13 into binary code, the change of the least significant bit causes actuation of variable delay one shots 22, 30 and movement of register 14 up one or down one. The register 14 is continuously compared with logic 13, and if there are any discrepancies at any time during the set, outputs are issued through error inhibit gates 28 after, of course, the initial delay period to insure that all 16 stages of the code conversion logic 13 have received the new reading. Since complement signals are immediately sent to register 14, the outputs of error inhibit gates 28 are of relatively short duration. However, they are long enough to actuate the error counters 32 and 35. If any of the error counters overflow, the clock is stopped and an inhibit signal is sent to stop inhibit error count 31, whereupon the operation of the tester essentially comes to a halt. There is thereby provided a reading of the encoder with the number of errors in each stage together with the time of the test. This provides an accurate measurement of the reliability of each of the stages of the encoder.

If the encoder has a pulsed output, the pulsed output can be fed into OR gate 43 through the external inhibits so that error count 31 is inhibited except when the pulse is being received from the encoder under test. In this case, the output of OR gate 43 can be routed to driver 29. Otherwise register 14 would always read zero.

If the input from the encoder is serial rather than parallel, it is necessary to convert the serial output into a parallel output. This may be done by means well known in the art after which the operation is the same.

The operation of the register 14, the means for counting up and down, and the means for complementing it are well known in the art of digital registers and need not be set forth specifically.

It will be seen by the foregoing description that a means has been provided to test the bandwidth, discrimination level, and accuracy of any encoder. The operator may test the encoder until the overflow shuts the clock off, which records the time to overflow, or the operator may test it for a set period and count the number of errors at each stage.

Obviously many modifications and variations of the present invention are possible in the light of the above teachings and it is therefore to be understood that within the scope of the appended claims the invention may be practiced otherwise than as specifically described.

What is claimed is:

1. An encoder tester for testing an analog-to-digital encoder, comprising:
   first means (12, 13) receiving sequences of digital representations from the encoder for converting said sequences into sequential binary codes;
   second means (14) operatively connected to said first means for subsequently recording each bit of each of said sequential binary codes;
   a comparator (21) operatively connected to said first means and said second means for providing an altering signal to said second means when the last significant bit provided by said first means and the least significant bit recorded by said second means exhibit different states;
   third means (22, 23) operatively connected to said comparator for delaying said altering signal;
   fourth means (24, 25) operatively connected to said third means for comparing the least and next to least significant bits recorded by said second means with the next to least significant bit provided by said first means and for providing a directional signal upon the receipt of said altering signal, the direction of said directional signal being a function of the binary code sequence;
   fifth means (26) operatively connected to said third means for delaying said altering signal for a period sufficient to allow said fourth means to provide said directional signal to said second means before said altering signal is supplied thereto; and
   sixth means (27) operatively connected to said first means and said second means for comparing like weighted bits produced by said first means and recorded by said second means in one to one correspondence and providing error signals when any of said like weighted bits are of different states.

2. An encoder tester as recited in claim 1 wherein: said second means includes a binary register for counting in the direction indicated by said directional signal and being incrementally updated upon the receipt of said altering signal; and
   including means operatively connected to said sixth means for providing complemented signals to said second means upon the receipt of said error signals.

3. An encoder tester as recited in claim 2 wherein said comparator comprises:
   an Exclusive OR gate receiving said sequential binary codes and operatively connected to said second means for comparing the least significant bit recorded therein with the last significant bit provided by said first means.

4. An encoder tester as recited in claim 3 wherein said Exclusive OR gate comprises:
   a first transistor;
   a load resistor in the emitter circuit of said first transistor;
   a second transistor;
   a load resistor in the emitter circuit of said second transistor;
   a first input terminal and a second input terminal, said first input terminal being connected to the load resistor of said first transistor and RC coupled to the base of said second transistor for receiving the least significant bits from said first means;
   said second input terminal being connected to the load resistor of said second transistor and RC coupled to the base of said first transistor for receiving the last significant bits from said second means; and
   a third transistor having its base RC coupled to the collectors of both of said first and second transistors for providing a high output signal when one or the other, but not both of the signals on said first and said second input terminals is high.

5. An encoder tester as recited in claim 1 further comprising:
   means operatively connected to said sixth means for counting individual bit errors between like weighted compared bits of said sequential binary codes and said bits stored in said second means for the entire period of the test.

6. An encoder tester as recited in claim 1 wherein said first means comprises:
   amplifying means and discriminating means for amplifying and discriminating, respectively, the output of the encoder being tested; and
   seventh means operatively connected to said amplifying and discriminating means for converting the output thereof into said sequential binary codes.

7. An encoder tester as recited in claim 6 wherein:
   said amplifying means includes means for shunting individual bits of said sequence of digital representations of greater than a selectably predetermined frequency to thereby control the bandwidth thereof; and
   said discriminating means includes means for providing a preset voltage level for controlling the logical threshold of said digital representations, whereby the noise bandwidth and amplitude of the encoder is determined by the number of errors detected at said selectably predetermined frequency and preset voltage level, respectively.

8. An encoder tester as recited in claim 6 wherein said seventh means comprises:
   code conversion logic means providing said sequential binary codes upon the receipt of signals received from said amplifying means and discriminating means.

References Cited

UNITED STATES PATENTS

| | | | |
|---|---|---|---|
| 2,953,777 | 9/1960 | Gridley | 340—347 |
| 3,196,351 | 7/1965 | Slepian | 340—204 X |
| 3,242,477 | 3/1966 | Frothingham | 340—347 |
| 3,270,321 | 8/1966 | Berkowitz | 340—204 X |

MALCOLM A. MORRISON, Primary Examiner

CHARLES E. ATKINSON, Assistant Examiner

U.S. Cl. X.R.

307—235, 239; 340—204, 347

UNITED STATES PATENT OFFICE
CERTIFICATE OF CORRECTION

Patent No. 3,469,084     Dated September 23, 1969

Inventor(s) Lane S. Garrett et al

It is certified that error appears in the above-identified patent and that said Letters Patent are hereby corrected as shown below:

Column 7, line 35, "last" should read -- least --. Column 8, lines 2 and 19, "last", each occurrence, should read -- least --.

SIGNED AND
SEALED

JUL 7 1970

(SEAL)
Attest:

Edward M. Fletcher, Jr.
Attesting Officer

WILLIAM E. SCHUYLER, JR.
Commissioner of Patents

FORM PO-1050 (10-69)